United States Patent
Kim et al.

(10) Patent No.: US 7,852,266 B2
(45) Date of Patent: Dec. 14, 2010

(54) APPARATUS AND METHOD FOR COLLABORATIVE LOCATION AWARENESS BASED ON WEIGHTED MAXIMUM LIKELIHOOD ESTIMATION

(75) Inventors: Jae-Ho Kim, Seongnam-si (KR);
Min-Hwan Song, Seongnam-si (KR);
Il-Yeup Ahn, Seongnam-si (KR);
Sang-Shin Lee, Seongnam-si (KR);
Kwang-Ho Won, Seongnam-si (KR);
Dong-Sun Kim, Seongnam-si (KR);
Tae-Hyun Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 363 days.

(21) Appl. No.: 11/965,027

(22) Filed: Dec. 27, 2007

(65) Prior Publication Data

US 2009/0091497 A1  Apr. 9, 2009

(30) Foreign Application Priority Data

Oct. 8, 2007  (KR) ...................... 10-2007-0100826

(51) Int. Cl.
*G01S 3/02* (2006.01)

(52) U.S. Cl. ..................................................... 342/451
(58) Field of Classification Search .......... 342/451–465
See application file for complete search history.

(56) References Cited

U.S. PATENT DOCUMENTS 7,170,441 B2 * 1/2007 Perl et al. ..................... 342/29
2006/0181458 A1 * 8/2006 Niu et al. ..................... 342/463

* cited by examiner

*Primary Examiner*—Thomas H Tarcza
*Assistant Examiner*—Nga X Nguyen
(74) *Attorney, Agent, or Firm*—Sughrue Mion, PLLC

(57) ABSTRACT

Provided is an apparatus and method for collaborative location awareness based on weighted maximum likelihood estimation (MLE), which is configured to improve accuracy of location awareness between nodes in estimating a location of a blind node. The method includes exchanging location awareness information with a reference node and a location-estimated blind node among peripheral nodes when location awareness is requested, performing location estimation based on weighted MLE, performing location calculation by using the location awareness information and an estimate obtained through the location estimation, and providing location awareness results of blind nodes.

24 Claims, 2 Drawing Sheets

APPARATUS AND METHOD FOR COLLABORATIVE LOCATION AWARENESS BASED ON WEIGHTED MAXIMUM LIKELIHOOD ESTIMATION

CROSS-REFERENCE TO RELATED APPLICATIONS

This application claims priority under 35 U.S.C. §119 to Korean Patent Application No. 10-2007-0100826, filed on Oct. 8, 2007, the disclosure of which is incorporated herein by reference in its entirety.

BACKGROUND OF THE INVENTION

1. Field of the Invention

The present disclosure relates to a location awareness technology, and more particularly, to an apparatus and method for collaborative location awareness based on weighted maximum likelihood estimation (MLE), which is capable of improving accuracy of location awareness between nodes in estimating a location of a blind node.

2. Description of the Related Art

Neal Patwari proposed the Cramer-Rao bound (CRB) and the maximum-likelihood estimator (MLE) for location awareness using time-of-arrival (TOA) information and received signal strengths (RSS) information between a sensor and its peripheral sensors in "Relative location estimation in wireless sensor networks, IEEE Trans. Signal processing, vol. 51, no. 8, pp. 2137-2148, August 2003 by N. Patwari, A. O. Here III, M. Perkins, N. S. Correal, and R. J. O'Dea".

In an algorithm proposed by N. Patwari, the MLE of the following Equation (1) is used as an estimate of a location of a blind node.

$$\hat{\theta}_R = \operatorname{argmin} \sum_{i=1}^{m+n} \sum_{\substack{j \in H(i) \\ j<i}} \left( \ln \frac{\tilde{d}_{i,j}^2 / C^2}{d_{i,j}^2} \right)^2 \quad (1)$$

where, $\hat{\theta}_R$: coordinate estimate of a blind node using RSS information, $d_{i,j}$: Euclidean distance, $\tilde{d}^2_{i,j}$: distance calculated based on the path-loss model by using the measured RSS information, m: number of reference nodes, n: number of blind nodes, H(i): nodes linked with node i, and C: defined as the following Equation (2)

$$C = \exp\left[\frac{1}{2}\left(\frac{\ln 10}{10} \frac{\sigma_{dB}}{n}\right)^2\right] \quad (2)$$

$\hat{\theta}_R$, which is the estimate that minimizes a maximum likelihood (ML) function expressed by the above Equation 1, is used an estimate of a location of blind nodes.

In the location awareness technology proposed in the algorithm by N. Patwari, the location estimation is performed basically in equal consideration of reference-node information and blind-node information. However, an error is not calculated in this algorithm despite the fact that the coordinates of the estimated location of the blind node include an error. That is, even though the related art location awareness algorithm such as the algorithm by N. Patwari includes an error of the location estimation in using the blind-node information, the error is not considered therein, which results in sensitive reaction to a fading situation of a location estimation environment and in deterioration of entire location estimation performance. Particularly, severely errored location-estimation may be caused in a specific fading environment.

SUMMARY

Therefore, an object of the present invention is to provide an apparatus and method for collaborative location awareness based on weighted maximum likelihood estimation, which is capable of improving accuracy of location awareness between nodes in estimating a location of a blind node.

To achieve these and other advantages and in accordance with the purpose(s) of the present invention as embodied and broadly described herein, an apparatus for collaborative location awareness based on weighted maximum likelihood estimation (MLE) in accordance with an aspect of the present invention comprises: a transceiving unit configured to transmit/receive location awareness information; a location estimating unit configured to perform location estimation of a specific unit block in a network by using weighted MLE on the basis of the location awareness information; a location calculating unit configured to calculate a location of a blind node by using the location awareness information and an estimate of the location estimating unit; and a location awareness unit configured to perform collaborative location awareness between the location-calculated blind node and peripheral nodes and calculate overall locations of the nodes.

To achieve these and other advantages and in accordance with the purpose(s) of the present invention, a method for collaborative location awareness based on weighted maximum likelihood estimation (MLE) in accordance with another aspect of the present invention comprises: exchanging location awareness information with a reference node and a location-estimated blind node among peripheral nodes when location awareness is requested; performing location estimation based on weighted MLE; performing location calculation by using the location awareness information and an estimate obtained through the location estimation; and providing location awareness results of blind nodes.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Figure 1:
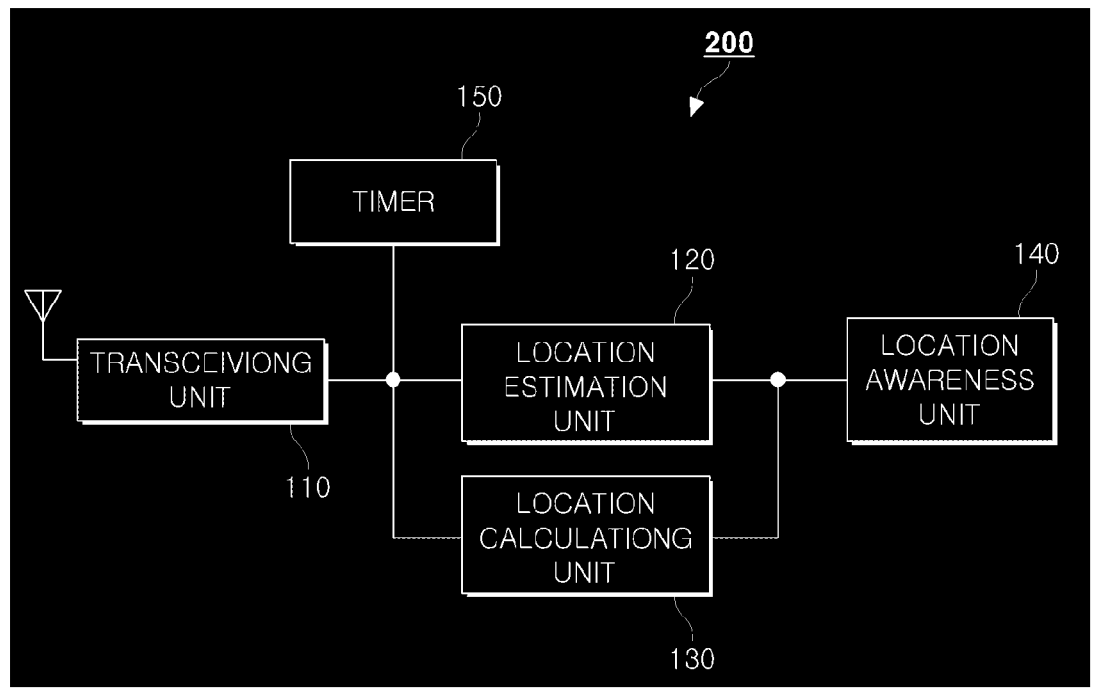
FIG. 1 is a block diagram of an apparatus for collaborative location awareness based on weighted maximum likelihood estimation according to an embodiment of the present invention.

An apparatus and method for location awareness according to an embodiment of the present invention may be performed at a node in a wireless sensor network, particularly, at a blind node. That is, an embodiment of the present invention is applied to location awareness of a blind node, and accuracy of location awareness can be improved by periodically exchanging information between blind nodes as well as by using reference-node information.

As a path-loss model, a path-loss model proposed in "Wireless Communications" by Theodore S. Rappaport may be used. The path-loss model is express by the following Equation (3)

$$P_{i,j} = \overline{P}_0 - 10n\log_{10}\left(\frac{d_{i,j}}{d_0}\right) + X_\sigma \quad (3)$$

where,
$P_{i,j}$: signal intensity in dBm when a radio frequency (RF) signal from node j is received by node i,
$\overline{P}_0$: mean reception intensity at distance $d_0$,
n: path-loss exponent,
$X_\sigma$: normal random variable having a standard deviation of σ reflecting a shadowing effect,
$d_{i,j}$: Euclidean distance from the nodes i to j, and
$d_0$: reference distance used when $\overline{P}_0$ is measured, which is 1 herein.

Hereinafter, specific embodiments will be described in detail with reference to the accompanying drawings. Like reference numerals refer to like elements throughout. Accordingly, in some embodiments, well-known device structures, and well-known techniques will not be described in detail to avoid ambiguous interpretation of the present invention.

FIG. 1 is a block diagram of an apparatus for collaborative location awareness based on weighted maximum likelihood estimation (MLE) according to an embodiment of the present invention.

Referring to FIG. 1, a location awareness apparatus 200 includes a transceiving unit 110, a location estimating unit 120, a location calculating unit 130, and a location awareness unit 140. The transceiving unit 110 is configured to receive/transmit information for location awareness (hereinafter, referred to as location awareness information). The location estimating unit 120 is configured to perform location estimation at a specific unit block in a network by using weighted MLE based on the location awareness information. The location calculating unit 130 is configured to calculate a location of a blind node by using the location awareness information and an estimate of the location estimating unit 120. The location awareness unit 140 is configured to perform collaborative location awareness between the location-calculated blind node and peripheral nodes, and to calculate the overall locations of the nodes.

When location awareness is requested, the transceiving unit 110 exchanges location awareness information such as received signal strength (RSS) information or time of arrival (TOA) information by using a sensor network such as a Zigbee network. For example, whenever a timer expires by timer operation, that is, periodically, the transceiving unit 110 requests location awareness information from nodes locations of which have been known and nodes locations of which have been estimated (hereinafter, referred to as location-estimated nodes). Then, the transceiving unit 110 receives the location awareness information, and provides the information to the location estimating unit 120. To this end, the location awareness apparatus 200 further includes a timer 150 that is configured to generate a timing signal for periodic exchange of the location awareness information.

The location estimating unit 120 estimates a location of a blind node by using weighted maximum likelihood estimation (MLE) at a specific unit block in a network on the basis of the location awareness information provided from the transceiving unit 110. A value that minimizes the maximum likelihood (ML) function may be used for the location estimation of the blind node.

The ML function is expressed by the following Equation (4)

$$\theta_i = \operatorname*{argmin} \sum_{j \in N(i)} \left( \ln\left( \frac{\tilde{d}_{i,j}^2}{(1+e_j)C^2 d_{i,j}^2} + \frac{e_j}{1+e_j} \right) \right)^2 \quad (4)$$

Variables of the ML functions are as follows:
θ: blind node, $\theta=[\theta_1, \ldots, \theta_n]$, i for 1 … n, $\theta_i=\{x_i, y_i\}$,
ρ: reference node, $\rho=[\rho_{n+1}, \ldots, \rho_{n+m}]$, i for n+1 … n+m, $\rho_i=\{x_i, y_i\}$,
γ: all of nodes existing in a network, $\gamma=\{x|x\in\theta\cup\rho\}$, for 1 … n+m, $\gamma_i=\{x_i, y_i\}$,
φ: all of location-calculated nodes among blind nodes, $\phi=\{x|x\in$ The set of location—estimated nodes in θ}, and
N(i): index of nodes usable as a reference node among neighbor nodes of node $\theta_i$, $N(i)=\{x|\gamma_x\in\{\phi\wedge\rho\}\hat{\ }\gamma_x\in$ The set of neighbor devices of $\theta_i\}$ In Equation (4), $e_j$ serves as a weight of an influence degree of information of each node in MLE calculation. That is, when $e_j$ is 0, the influence degree is maximized, and when $e_j$ is greater than 0, the influence degree on the ML function degreases. In the case of a reference node, the value of $e_j$ is 0. In the case of a blind node, the value of $e_j$ is expressed by applying a weight rate (w) to a Cramer-Rao low bound as in the following Equation (5)

$$e_i^2 = \begin{cases} 0, & \gamma_i \in \rho \\ \dfrac{1}{b} \dfrac{\sum_{j \in N(i)} d_{i,j}^{-2}}{\sum_{j \in N(i)} \sum_{\substack{k \in N(i) \\ k > j}} \left( \dfrac{d_{i\perp j,k} \, d_{j,k}}{d_{i,j}^2 \, d_{i,k}^2} \right)^2} w, & \gamma_i = \theta \end{cases} \quad (5)$$

where $$b = \left(\frac{10n}{\sigma_{dB}\ln 10}\right)^2, \text{ and}$$

$$d_{i\perp j,k} = \frac{2\sqrt{s(s-d_{ij})(s-d_{ik})(s-d_{jk})}}{d_{jk}}$$

where $s = \dfrac{d_{ij} + d_{ik} + d_{jk}}{2}$

The weight rate (w) applied for $e_i$ is determined experimentally as a value having a minimum mean location-estimation error. The standard deviation σ is an environment variable and varies with a location-estimation application environment. The weight rate (w) must be selectively used according to a change of the standard deviation σ.

The location estimating unit 120 can calculate estimate $\hat{\theta}_i$ that minimizes the ML function by using a method employing a nonlinear conjugate gradient method (NCGM).

In the method employing the NCGM, a Polak-Ribiere algorithm having a characteristic of fast convergence may be used to improve a calculation speed. The Polak-Ribiere algorithm is as follows:

$$x_{(i+1)} = x_{(i)} + \alpha_{(i)} d_{(i)}$$

$$d_{(0)} = r_{(0)} = -f'(x_{(0)})$$

$$d_{(i+1)} = x_{(i+1)} + \beta_{(i+1)} d_{(i)}$$

$$\beta_{(i+1)} = \max\left\{\frac{r_{(i+1)}^T (r_{(i+1)} - r_{(i)})}{r_{(i)}^T r_{(i)}}, 0\right\}$$

$$r_{(i+1)} = -f'(x_{(i+1)})$$

$$\alpha_{(i)}: \text{minimizes } f(x_{(i)} + \alpha_{(i)} d_{(i)})$$

Prior to the application of the Polak-Ribiere algorithm, a pre-treatment that selects proper initial x may be performed.

As a line search algorithm for calculating $\alpha_{(i)}$ in the Polak-Ribiere algorithm, a secant method modified suitably for the ML function may be used. The line search algorithm is as follows:

$$\alpha = \begin{cases} \log_2(1+\eta), & \eta \geq 0 \\ -\log_2(1-\eta), & \eta < 0 \end{cases}$$

$$\eta = -\varepsilon \frac{[f'(x)]^T d}{[f'(x+\varepsilon d)]^T d - [f'(x)]^T d}$$

$$\varepsilon_{[0]} = \text{choose an arbitrary}$$

$$\varepsilon_{[i+1]} = -\alpha_{[i]}$$

The derivative f'(x, y) used to apply the line search algorithm can be derived from the ML function and is expressed as $$f(xy)' = \begin{bmatrix} \frac{\partial}{\partial x} f'(x, y) \\ \frac{\partial}{\partial y} f(x, y) \end{bmatrix} \frac{\partial}{\partial x} f(x, y),$$

a partial derivative with respect to x of f'(x, y) is derived as follows.

$$\frac{\partial}{\partial x} f(x, y) = -4 \sum_{i=1}^{n} \left[ \ln\left(\frac{\hat{d}_1^2}{(1+e_i) c^2 d_i^2}\right) + \frac{e_i}{1+e_i} \right] \frac{\hat{d}_1^2 (x - x_i)}{d_i^2 (\hat{d}_1^2 + e_i c^2 d_i^2)}$$

$\frac{\partial}{\partial y} f(x, y)$, a partial derivative with respect to y of $f'(x, y)$ is derived as follows:

$$\frac{\partial}{\partial x} f(x, y) = -4 \sum_{i=1}^{n} \left[ \ln\left(\frac{\hat{d}_1^2}{(1+e_i) c^2 d_i^2}\right) + \frac{e_i}{1+e_i} \right] \frac{\hat{d}_1^2 (y - y_i)}{d_i^2 (\hat{d}_1^2 + e_i c^2 d_i^2)}$$

The location estimating unit 120 can calculate estimate $\hat{\theta}_i$ that minimizes the ML function by using a method that minimizes the MLE through repetitive calculation in a search space. That is, the location estimating unit 120 calculates the ML function with respect to initial arbitrary coordinates (X, Y) in the search space, and updates X, Y and calculate the ML function repetitively until coordinates (X, Y) that minimize the ML function are obtained. The method of minimizing the MLE through the repetitive calculation in the search space allows a considerably simple configuration in implementation.

The location calculating unit 130 calculates a location of a corresponding blind node through interaction with the location estimating unit 120. The location calculating unit 130 calculates a current location based on the location awareness information from the transceiving unit 110 and the estimate $\hat{\theta}_i$ that minimizes the ML function.

The location awareness unit 140 provides location awareness results of blind nodes existing in a network by using the location estimating unit 120. That is, the location awareness unit 140 performs the overall location awareness based on the location awareness results of a unit block. Also, the location awareness unit 140 provides collaborative location awareness between nodes, and continuously reflects the location awareness results of peripheral nodes, thereby reduce an error of the location awareness result. That is, the location awareness unit 140 repetitively reflects the location awareness results of the peripheral nodes to perform the location estimation and update the location awareness results. This will now be described with reference to FIG. 3.

Figure 2:
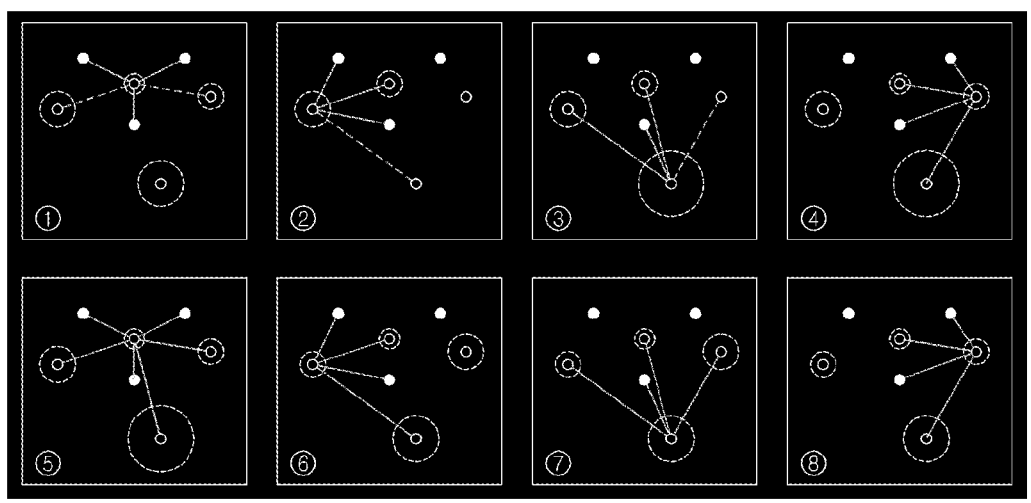
FIG. 2 shows a collaborative location awareness algorithm according to an embodiment of the present invention.

FIG. 2 shows a collaborative location awareness algorithm according to an embodiment of the present invention. Referring to FIG. 2, a blind node estimates its location by using a reference node and a location-estimated blind node among neighbor nodes. Also, the blind node continuously repeats location estimation and updates according to location estimation periods of the nodes, and thus improves the location awareness result based on the updated information of the neighbor nodes. In FIG. 2, a black dot indicates a reference node, a white dot indicates a blind node, a solid line indicates a node used for location awareness, and a dotted line indicates a node that is a neighbor node but not used for the location awareness. The node used for the location awareness means a node that exchanges information for the location awareness with the corresponding node. The exchanged information may include RSS information, TOA information, a weighted Cramer-Rao low bound, node coordinates, or estimated coordinates information. Each of the nodes periodically updates the location awareness result to calculate a new location and re-calculate the CRB.

Figure 3:
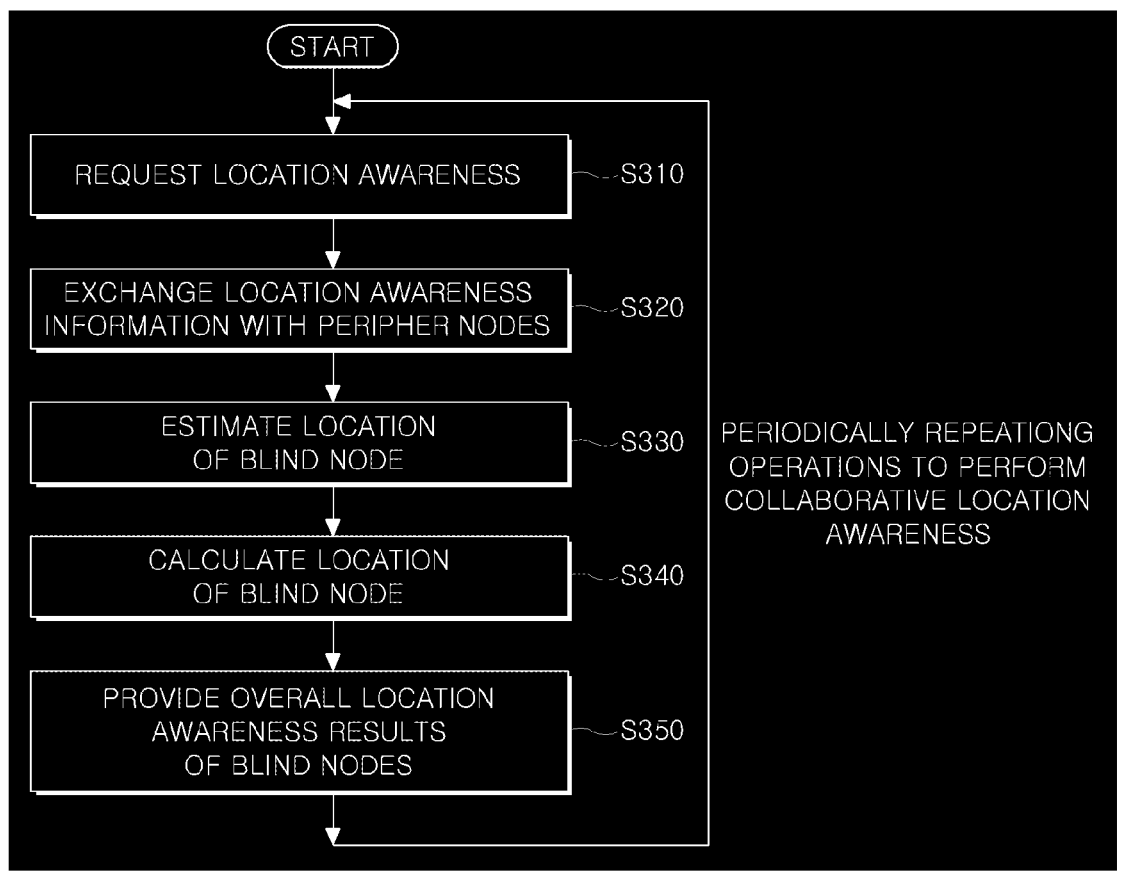
FIG. 3 is a flowchart of a method for collaborative location awareness based on weighted likelihood estimation according to an embodiment of the present invention.

FIG. 3 is a flowchart of a method for collaborative location awareness based on weighted likelihood estimation according to an embodiment of the present invention.

Referring to FIG. 3, when location awareness is requested in operation S310, the transceiving unit 110 exchanges location awareness information with peripheral nodes in operation S320. That is, when a location awareness process is initiated due to timer expiration or the like, the transceiving unit 100 exchanges the location awareness information with a reference node and a location-estimated blind node among neighbor nodes. As mentioned above, the location awareness information may include RSS information, TOA information, a weighted Cramer-Rao low bound, node coordinates, or estimated coordinates information. The blind node among the neighbor nodes provides the location awareness information through location estimation, and the reference node may provide determined location awareness information.

In operation S330, the location estimating unit 120 estimates a location of a blind node by using weighted maximum likelihood estimation (MLE) of a specific unit block in a network on the basis of the location awareness information provided from the transceiving unit 110.

As mentioned above, an estimate that minimizes a maximum likelihood (ML) function may be used as a location estimate of the blind node, and the ML function is expressed by the above Equation (4). In Equation (4), $e_j$ serves as a weight of an influence degree of information of each node in the MLE calculation. That is, when $e_j$ is 0, the influence degree is maximized, and when $e_j$ is greater than 0, the influence degree on the ML function degreases. In the case of a reference node, the value of $e_i$ is 0. In the case of a blind node, the value of $e_i$ is expressed by applying a weight rate (w) to a Cramer-Rao low bound as in the above Equation (5).

The location estimating unit 120 can calculate the estimate $\hat{\theta}_i$ that minimizes the ML function by using a method employing a nonlinear conjugate gradient method (NCGM) or by using a method that minimizes the MLE through repetitive calculation in a search space.

In operation S340, when the location estimation is completed, the location calculating unit 130 calculates a location of the corresponding blind node through interaction with the location estimating unit 120.

In operation S350, the location awareness unit 140 converts relative location information calculated by the location calculating unit 130 into substantial location information required in application of the entire network, and provides the information. That is, the location awareness unit 130 converts relative location coordinates with reference to a peripheral node into coordinates applied to the entire application zone. Also, the location awareness unit 140 allows repetitive operations of S310 to S350, thereby providing repetitive collaborative location awareness between the nodes. Accordingly, the overall location-awareness performance can be improved without being greatly affected by a fading situation of a location estimation environment. In an actual experiment, the standard deviation of a path-loss model was 3 in 400 square meters, and the mean location-awareness error of blind nodes was calculated, using 4 reference nodes and 9 blind nodes. In this case, a result reveals that the collaborative location-awareness algorithm based on the weighted MLE according to an embodiment of the present invention achieves performance improvement of approximately 43% as compared to the related art algorithm by N. Patwari.

In the apparatus and method for collaborative location awareness based on weighted MLE according to an embodiment of the present invention, a weight is applied to information of a blind node according to a location-awareness error limit of the corresponding node in location estimation, so that performance associated with a location-awareness error and standard deviation can be improved. Also, since the blind node repetitively performs collaborative location awareness with a reference node and location-estimated blind nodes among neighbor nodes, the location awareness error can be minimized, and location awareness performance can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for collaborative location awareness based on weighted maximum likelihood estimation (MLE), comprising:
  a transceiving unit configured to transmit/receive location awareness information;
  a location estimating unit configured to perform location estimation of a specific unit block in a network by using weighted MLE on the basis of the location awareness information, the weighted MLE being obtained by applying a weight on the basis of a Cramer-Rao low bound of a neighbor node which is used in the location estimation and the weighted MLE using the weight applied according to whether the location awareness information is received from a reference node or another blind node;
  a location calculating unit configured to calculate a location of a blind node having an unknown location by using the location awareness information and an estimate of the location estimating unit; and
  a location awareness unit configured to perform collaborative location awareness between the location-calculated blind node and peripheral nodes and calculate overall locations of the nodes.

2. The apparatus of claim 1, wherein the transceiving unit periodically exchanges the location awareness information with nodes locations of which have been known and nodes locations of which have been estimated.

3. The apparatus of claim 2, further comprising a timer configured to generate a timing signal for periodic exchange of the location awareness information.

4. The apparatus of claim 1, wherein the location estimating unit estimates a location of a corresponding blind node by using a maximum likelihood (ML) function expressed as:

$$\hat{\theta}_i = \mathrm{argmin} \sum_{j \in N(i)} \left( \ln \left( \frac{\hat{d}_{i,j}^2}{(1+e_j)C^2 d_{i,j}^2} + \frac{e_j}{1+e_j} \right) \right)^2$$

where,
  $\hat{\theta}_i$: value that minimizes the maximum likelihood (ML),
  $d_{i,j}$: Euclidean distance from the nodes i to j,
  $\theta$: blind node, $\theta=[\theta_1, \ldots, \theta_n]$, i for 1 ... n, $\theta_i=\{x_i,y_i\}$,
  $e_j$: weight of an influence degree of information of each node in MLE calculation, and
  N(i): index of nodes usable as a reference node among neighbor nodes of node $\theta_i$,
  N(i)=$\{x|\gamma_x \in \{\phi \cup \rho\} \wedge \gamma_x \in$ The set of neighbor devices of $\theta_i\}$, where,
  $\rho$: reference node, $\rho=[\rho_{n+1}, \ldots, \rho_{n+m}]$, i for n+1 ... n+m, $\rho_i=\{x_{i,yi}\}$,
  $\gamma$: all of nodes existing in a network, $\gamma=\{x|x \in \theta \wedge \rho\}$, for 1 ... n+m, $\gamma_i=\{x_i, y_i\}$, and
  $\phi$: all of nodes locations of which have been calculated among blind nodes,
  $\phi=\{x|x \in$ The set of location—estimated nodes in $\theta\}$.

5. The apparatus of claim 4, wherein the weight is zero in the case of the reference node.

6. The apparatus of claim 4, wherein in the case of the blind node, the weight is a value obtained by applying a weight rate (w) to a Cramer-Rao low bound, expressed as:

$$e_i^2 = \begin{cases} 0, & \gamma_i \in \rho \\ \dfrac{1}{b} \dfrac{\sum_{j \in N(i)} d_{i,j}^{-2}}{\sum_{j \in N(i)} \sum_{\substack{k \in N(i) \\ k>j}} \left(\dfrac{d_{i\perp j,k} d_{j,k}}{d_{i,j}^2 d_{i,k}^2}\right)^2} w, & \gamma_i = \theta \end{cases}$$

where, $$b = \left(\dfrac{10n}{\sigma_{dB} \ln 10}\right)^2, \text{ and}$$

$$d_{i\perp j,k} = \dfrac{2\sqrt{s(s-d_{ij})(s-d_{ik})(s-d_{jk})}}{d_{jk}}$$

where $s = \dfrac{d_{ij} + d_{ik} + d_{jk}}{2}$.

7. The apparatus of claim 4, wherein the location estimating unit determines $\hat{\theta}_i$ that minimizes the ML function as a location estimate of the corresponding blind node.

8. The apparatus of claim 7, wherein the location estimating unit calculates $\hat{\theta}_i$ that minimizes the ML function by using a method employing a nonlinear conjugate gradient method (NCGM).

9. The apparatus of claim 8, wherein in the method employing the NCGM, the location estimating unit calculates $\hat{\theta}_i$ that minimizes the ML function by using a Polak-Ribiere algorithm employing a line search algorithm of a secant method modified suitably for the ML function to improve a calculation speed.

10. The apparatus of claim 7, wherein the location estimating unit calculates $\hat{\theta}_i$ that minimizes the ML function by using a method that minimizes the MLE through repetitive calculation in a search space.

11. The apparatus of claim 1, wherein the location awareness unit performs location estimation and updates a location awareness result, repetitively reflecting location awareness results of the peripheral nodes.

12. The apparatus of claim 1, wherein the location awareness information includes received signal strength (RSS) information, time of arrival (TOA) information, a weighted Cramer-Rao low bound, node coordinates, or estimated coordinates information.

13. A method for collaborative location awareness based on weighted maximum likelihood estimation (MLE), comprising:
 exchanging location awareness information with a reference node and a location-estimated blind node having an unknown location among peripheral nodes when location awareness is requested;
 performing location estimation based on weighted MLE, the weighted MLE being obtained by applying a weight on the basis of a Cramer-Rao low bound of a neighbor node which is used in the location estimation and the weighted MLE using the weight applied according to whether the location awareness information is received from a reference node or another blind node;
 performing location calculation by using the location awareness information and an estimate obtained through the location estimation; and
 providing location awareness results of blind nodes.

14. The method of claim 13, wherein the exchanging of the location awareness information comprises periodically requesting the location awareness.

15. The method of claim 13, wherein the location awareness information includes received signal strength (RSS) information, time of arrival (TOA) information, a weighted Cramer-Rao low bound, node coordinates, or estimated coordinates information.

16. The method of claim 13, wherein the performing of the location estimation comprises estimating a location of a blind node by using a maximum likelihood (ML) function expressed as:

$$\hat{\theta}_i = \arg\min \sum_{j \in N(i)} \left(\ln\left(\dfrac{\tilde{d}_{i,j}^2}{(1+e_j)C^2 d_{i,j}^2} + \dfrac{e_j}{1+e_j}\right)\right)^2$$

where,
$\hat{\theta}_i$: value that minimizes the maximum likelihood(ML),
$d_{i,j}$: Euclidean distance from the nodes i to j,
$\theta$: blind node, $\theta=[\theta_1, \ldots, \theta_n]$, i for $1 \ldots n$, $\theta_i=\{x_i, y_i\}$,
$e_j$: weight of an influence degree of information of each node in MLE calculation, and
$N(i)$: index of nodes usable as a reference node among neighbor nodes of node $\theta_i$,
$N(i)=\{x|\gamma_x\in\{\phi\wedge\rho\}\wedge\gamma_x\in$ The set of neighbor devices of $\theta_i\}$, where,
$\rho$: reference node, $\rho=[\rho_{n+1}, \ldots, \rho_{n+m}]$, i for $n+1 \ldots n+m$, $\rho_i=\{x_{i,yi}\}$,
$\gamma$: all of nodes existing in a network, $\gamma=\{x|x\in\theta\cup\rho\}$, for $1 \ldots n+m$, $\gamma_i=\{x_i, y_i\}$, and
$\phi$: all of nodes locations of which have been calculated among blind nodes,
$\phi=\{x|x\in$ The set of location—estimated nodes in $\theta\}$.

17. The method of claim 16, wherein the weight is zero in the case of the reference node.

18. The method of claim 16, wherein in the case of the blind node, the weight is a value obtained by applying a weight rate (w) to a Cramer-Rao low bound, expressed as:

$$e_i^2 = \begin{cases} 0, & \gamma_i \in \rho \\ \dfrac{1}{b} \dfrac{\sum_{j \in N(i)} d_{i,j}^{-2}}{\sum_{j \in N(i)} \sum_{\substack{k \in N(i) \\ k>j}} \left(\dfrac{d_{i\perp j,k} d_{j,k}}{d_{i,j}^2 d_{i,k}^2}\right)^2} w, & \gamma_i = \theta \end{cases}$$

where, $$b = \left(\dfrac{10n}{\sigma_{dB} \ln 10}\right)^2, \text{ and}$$

$$d_{i\perp j,k} = \dfrac{2\sqrt{s(s-d_{ij})(s-d_{ik})(s-d_{jk})}}{d_{jk}}$$

where $s = \dfrac{d_{ij} + d_{ik} + d_{jk}}{2}$.

19. The method of claim 16, wherein the performing of the location estimation comprises determining $\hat{\theta}_i$ that minimizes the ML function as a location estimate of the corresponding blind node.

20. The method of claim 19, wherein the performing of the location estimation comprises calculating $\hat{\theta}_i$ that minimizes the ML function by using a method employing a nonlinear conjugate gradient method (NCGM).

21. The method of claim 20, wherein, in the method employing the NCGM, $\hat{\theta}_i$ that minimizes the ML function is calculated by using a Polak-Ribiere algorithm employing a line search algorithm of a secant method modified suitably for the ML function to improve a calculation speed.

22. The method of claim 16, wherein the performing of the location estimation comprises calculating $\hat{\theta}_t$ that minimizes the ML function by using a method that minimizes the MLE through repetitive calculation in a search space.

23. The method of claim 13, further comprising periodically repeating the operations of claim 13 to provide repetitive collaborative location-awareness between the nodes.

24. A computer-readable recording medium storing a program for executing a method for collaborative location awareness based on weighted maximum likelihood estimation (MLE), the method comprising:

exchanging location awareness information with a reference node and a location-estimated blind node having an unknown location among peripheral nodes when location awareness is requested;

performing location estimation based on weighted MLE, the weighted MLE being obtained by applying a weight on the basis of a Cramer-Rao low bound of a neighbor node which is used in the location estimation and the weighted MLE using the weight applied according to whether the location awareness information is received from a reference node or another blind node;

performing location calculation by using the location awareness information and an estimate obtained through the location estimation; and providing a location awareness result of blind nodes.

* * * * *